United States Patent [19]

Tomii et al.

[11] Patent Number: 5,068,579
[45] Date of Patent: Nov. 26, 1991

[54] FLAT CONFIGURATION COLOR CRT DISPLAY APPARATUS WITH SCANNING CORRECTION FOR COMPONENT POSITIONING ERROR

[75] Inventors: Kaoru Tomii, Isehara; Hiroshi Miyama, Yokohama; Yoshikazu Kawauchi, Kawasaki, all of Japan

[73] Assignee: Matsushita Electric Industrial Co., Ltd., Osaka, Japan

[21] Appl. No.: 524,953

[22] Filed: May 18, 1990

[30] Foreign Application Priority Data

May 19, 1989 [JP] Japan .................................. 1-126951

[51] Int. Cl.⁵ .......................... H01J 29/70; H01J 29/72
[52] U.S. Cl. ...................................... 315/366; 313/422
[58] Field of Search .......................... 315/366; 313/422

[56] References Cited

U.S. PATENT DOCUMENTS 4,694,225 9/1987 Tomii et al. .......................... 315/366
4,955,681 9/1990 Sekihara et al. ..................... 313/422

FOREIGN PATENT DOCUMENTS 54-143063 11/1979 Japan .
55-33734 3/1980 Japan .

Primary Examiner—Theodore M. Blum
Attorney, Agent, or Firm—Lowe, Price, Leblanc & Becker

[57] ABSTRACT

An image display apparatus includes a flat configuration CRT which is provided with a second set of horizontal deflection electrodes in addition to the main horizontal deflection electrodes. A sawtooth waveform correction deflection voltage is applied to the second electrodes such as to slow the rate of electron beam scanning each time a portion of a fluorescent layer pattern of the screen is scanned, thereby increasing display brightness, while in addition the correction deflection voltage and the electron beam modulation signals are phase shifted by a mutually identical amount once in each scan line such as to compensate for a position deviation between the main horizontal deflection electrodes and the fluorescent layer pattern.

12 Claims, 7 Drawing Sheets

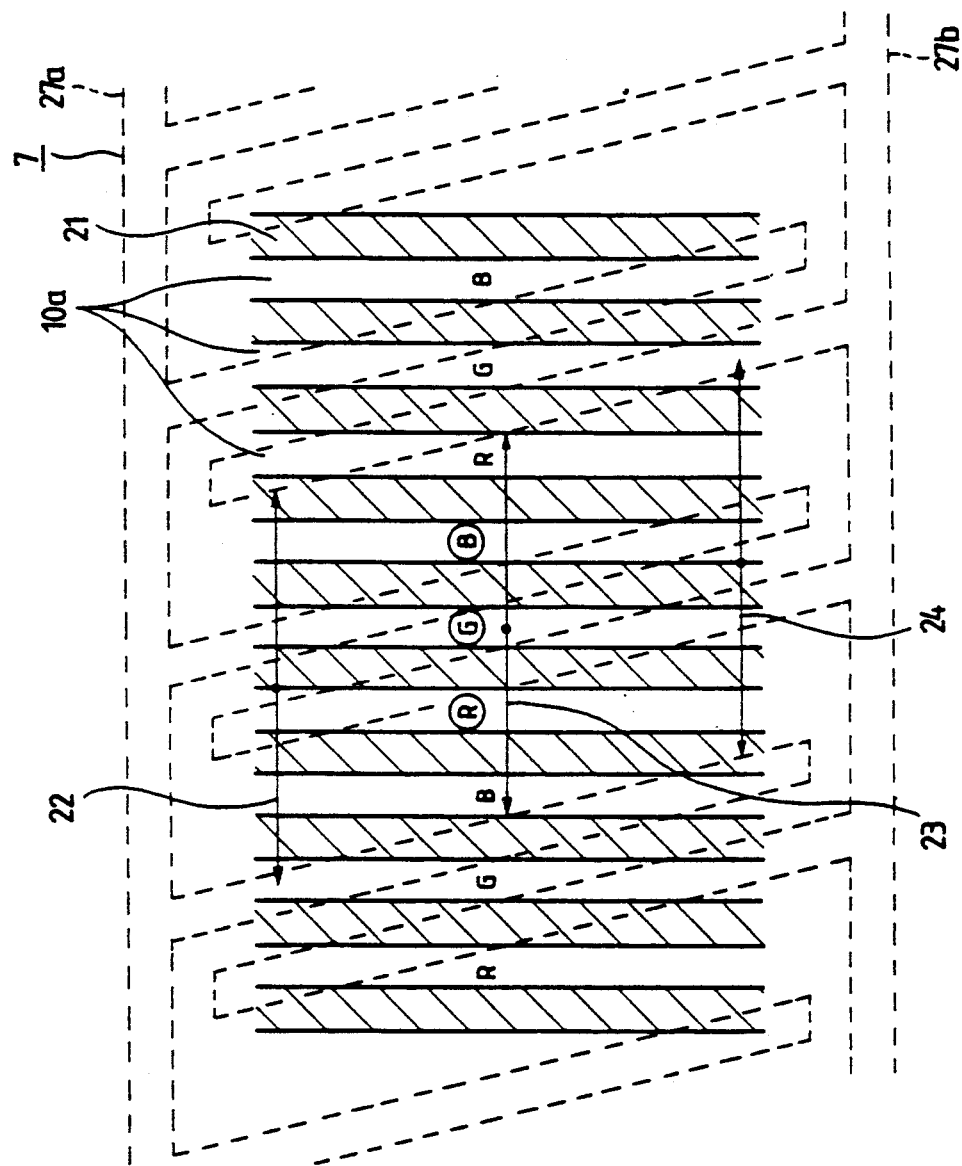

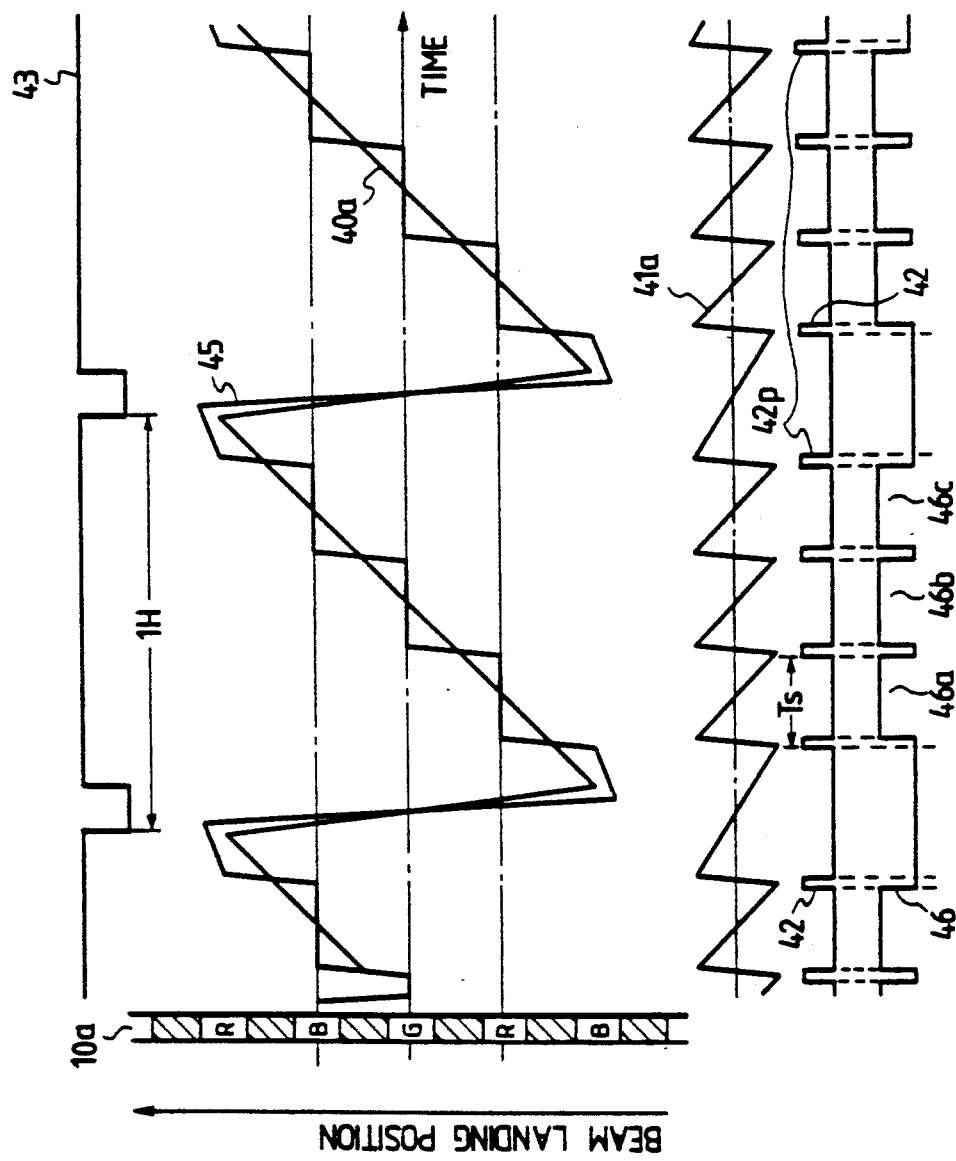

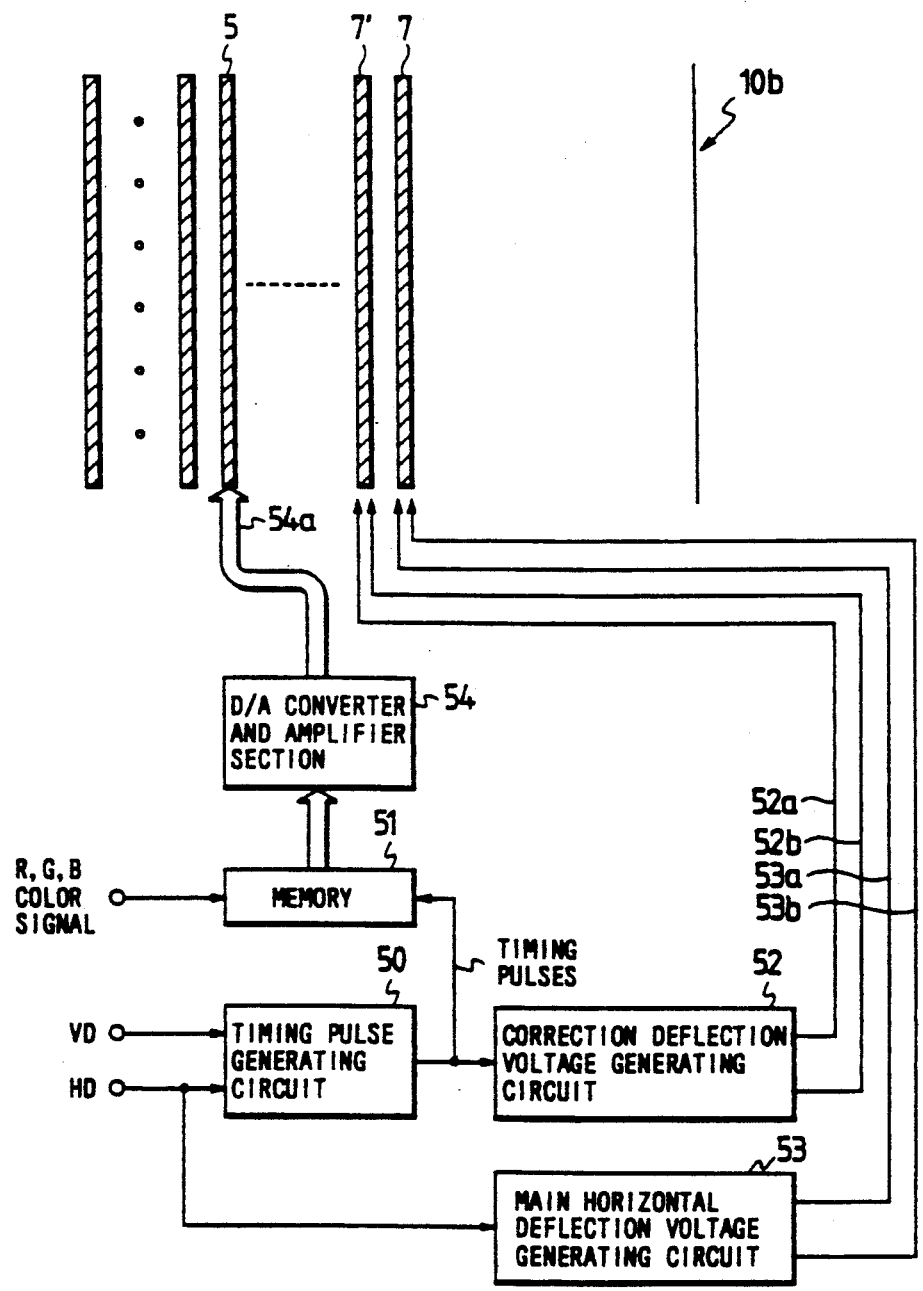

FLAT CONFIGURATION COLOR CRT DISPLAY APPARATUS WITH SCANNING CORRECTION FOR COMPONENT POSITIONING ERROR

BACKGROUND OF THE INVENTION

Field of Applicable Technology

The present invention relates to a flat configuration image display apparatus, and in particular to a display apparatus based on a flat configuration color CRT (cathode ray tube) for use in equipment such as color television receivers, computer display terminal, etc.

In the prior art, several types of display apparatus based on a flat configuration CRT have been described, for example in Japanese Patent Laid-open No. 54-143063 and 55-33734. With such an image display apparatus, a plurality of thin line electron beams are derived from one or more respective flat-shaped electron beams produced from an electron source which includes at least one line cathode. A periodically varying voltage is applied between vertical deflection electrodes through which the line beams are passed, to execute vertical scanning, and thereafter each electron beam is deflected horizontally by horizontal deflection electrodes to which a horizontal scanning voltage is applied. Each electron beam then falls on a pattern of fluorescent layer portions which are formed on a flat transparent substrate, these fluorescent layer portions generally consisting of a parallel array of vertically aligned stripes formed as a repeated pattern of red-emission, green-emission and blue-emission fluorescent stripes. Images, characters, etc. are thereby displayed, by appropriately modulating each electron beam.

A typical configuration for such a prior art flat configuration image display apparatus will be described in the following, referring to FIG. 1. In FIG. 1, numeral 1 denotes one of a set of parallel horizontally extending line cathodes, each of which is formed of tungsten wire having a diameter of from 10 microns to several tens of microns and having a layer of electron-emissive oxide material coated thereon to a thickness of several microns to several tens of microns. A predetermined value of voltage is applied between the ends of a line cathode to heat the cathode to a temperature of 600° to 800° C., whereby electrons are uniformly emitted from the emissive oxide material. With one method or controlling this cathode heating which has been proposed, as shown in FIG. 2, a DC voltage $E_k$ for producing heating is switched on and off in synchronism with the vertical synchronizing signal (1V), while a pulse voltage $E_{kp}$ is applied to the cathode 1 when the voltage $E_k$ is off. Each pulse of voltage $E_{kp}$ is applied only for the duration of an interval in which electron emission is required. Usually, a plurality of these line cathodes are used, arranged as a vertically extending array of horizontally oriented line cathodes, with rows of electron beams derived from successive ones of the line cathodes being used to scan successive sets of lines of a video signal frame. To do this, pulses of the form shown in FIG. 2 are sequentially applied to the plurality of line cathodes 1, to select one cathode at a time for emission of electrons to form a row of electron beams. Each selected row of electron beams is horizontally and vertically deflected to successively produce a set of successive scan lines of the display, i.e. each electron beam forms one block of the display picture, whereby frame of a television picture is formed each time that all of the cathodes are successively selected.

Numeral 2 denotes a rear electrode, formed of a metal plate or formed by a process such as vacuum evaporative deposition or sputtering of a conducting film such as a metallic film or a transparent conducting film on an internal face of an external enclosure (not shown in the drawing) of the display apparatus. The rear electrode 2 is held at a potential such that an electron beam which is generated by heating a line cathode 1 is impelled in a predetermined direction. Numeral 3 denotes an electron beam extraction electrode, for extracting electron beams that are generated from the line cathodes 1. The electron beam extraction electrode 3 has through-apertures 3a formed therein for extracting the electron beams 11, with these apertures being positioned opposite respective ones of the line cathodes 1. The shape, dimensions and number of these through-apertures 3a are determined by the required numbers of electron beam spots, the required level of electron beam current, etc. Numeral 4 denotes vertical deflection electrodes, consisting of conducting electrodes 4a which are formed on both sides of substrates made of an insulating material, by a process such as evaporative deposition, screen printing, etc, and which are subjected to periodically varying vertical scanning voltages to deflect the electron beams 11 in the vertical direction of the display picture. Numeral 5 denotes modulation electrodes, which are divided into vertical-extending separate electrodes for respective ones of each horizontally extending row of electron beams 11 generated from a line cathode 1. Modulation signals are applied to these modulation electrodes in synchronism with horizontal and vertical scanning, to modulate the electron beam levels in accordance with a video signal. Numeral 6 denotes a shield electrode which is held at a fixed potential and serves to mutually shield the electrodes which are positioned on either side thereof. Numeral 7 denotes horizontal deflection electrodes, which are divided into two comb-shaped parts and which are subjected to periodically varying horizontal deflection voltages for deflecting the electron beams 11 in the horizontal direction. Numeral 8 denotes accelerator electrodes which are coupled to a fixed high level of DC voltage, to accelerate the electron beam 11, and 9 denotes a transparent substrate formed of a material such as glass. In general, the faceplate of a glass outer enclosure of the CRT is used as this transparent substrate 9, with a vacuum being of course maintained within that enclosure. On the inner (vacuum) surface of the substrate 9 is formed a photoemissive section 10, consisting of a set of vertically extending stripe-shaped layer portions of fluorescent material arranged in a pattern consisting of successive repetitions of a set of red, green and blue-emission stripes, and a metal back layer, the latter being formed of aluminum film. Normally, the high DC voltage (e.g. 5 to 20 KV) that is applied to the acceleration electrodes is also applied to this metal back layer. Although it will be assumed throughout the following that the fluorescent layer portions are formed as continuous vertical stripes, other patterns based on vertical columns of fluorescent layer portions could also be envisaged.

Each of the display blocks has a fixed width (determined by the number of fluorescent layer portions of a block) and a fixed height (determined by the number of scan line portions in a block). One complete scan line of the display is formed of the respective scan line portions of a horizontally extending set of display blocks, and in this way the blocks combine to form a single image on the fluorescent layer surface. Such an apparatus has a simple configuration, a high level of brightness, high resolution, and thin shape.

However with such a prior art flat configuration image display apparatus, as shown in FIG. 3, a position deviation may occur at the time of assembly of the apparatus, whereby the stripe pattern of the fluorescent layer portions 10a is axially rotated with respect to the horizontal deflection electrodes 7. In FIG. 1, 11' and 11" respectively denote two electron beams of an uppermost and a lowermost set of vertically aligned display blocks. That is to say, the respective beam landing positions of the beams 11" and 11', in the horizontally undeflected condition, are vertically mutually aligned. If there were no position deviation such as that shown in FIG. 5, then in this horizontally undeflected condition, the uppermost beam landing position of the upper beam 11' (i.e. during scanning of the uppermost line of the display picture) and the lowermost beam landing position of the lower beam 11" (i.e. during scanning of the lowermost scan line) would coincide with a single one of the color stripes 10a, which in this example is a green-emission stripe. However if there is a component position deviation such as that shown in FIG. 5, then when periodic horizontal deflection is applied to the electron beams 11 such as to produce display of an image, there will be color errors between the upper and lower portions of the displayed image.

As a result, due to the very small dimensions which are involved, it is extremely difficult in practice to manufacture such a display apparatus with a sufficient degree of consistent positioning accuracy to ensure a high manufacturing yield.

SUMMARY OF THE INVENTION

It is an objective of the present invention to provide a flat configuration image display apparatus which overcomes the disadvantages of the prior art as set out above.

To achieve enhanced display brightness with an apparatus according to the present invention, additional horizontal deflection electrodes are driven by a correction deflection voltage having a waveform such that each electron beam is caused to scan relatively slowly (or to be momentarily halted) during a fixed-duration time interval each time that the beam landing position reaches a fluorescent layer portion, and to rapidly scan the intervening space between adjacent light-emitting layer portions.

To achieve correction for a rotational position deviation between the fluorescent layer pattern and the horizontal deflection electrodes, in conjunction with such means for increasing display brightness, such an apparatus further includes means for phase shifting the modulation signal voltages in synchronism with phase shifting of the correction deflection voltage, by a fixed amount in each horizontal scanning interval, such as to compensate for the position deviation.

More specifically, according to a first aspect, a flat configuration image display apparatus according to the present invention comprises means for generating a plurality of electron beams within an evacuated containing envelope, modulation electrode means for modulating the electron beams, means for applying electron beam modulation signals to the modulation electrode means, a display surface formed with a pattern of fluorescent layer portions, scanning means for deflecting the electron beams as an array of horizontal scan lines traversing the fluorescent layer portions, the scanning means including main horizontal deflection electrodes for horizontally deflecting the electron beams and main horizontal deflection voltage generating means for applying between the main horizontal deflection electrodes a main horizontal deflection voltage having a sawtooth waveform with a period equal to a horizontal scanning period, and is characterized in further comprising:

correction deflection electrodes positioned to horizontally deflect the electron beams;

correction deflection voltage generating means for applying between the correction deflection electrodes a correction deflection voltage having a sawtooth waveform with a period that is substantially equal to n times the horizontal scanning period, where n is a fixed integer of value 2 or more, with the sawtooth waveform of the correction deflection voltage and the sawtooth waveform of the main horizontal deflection voltage having mutually opposite directions of slope.

According to a second aspect, a flat configuration image display apparatus according to the present invention is further characterized in that the electron beams include at least one pair of electron beams having respective beam landing positions which are substantially mutually vertically aligned when in a horizontally non-deflected condition, and in that the phase of the electron beam deflection voltage and the phase of the correction deflection voltage waveform are each shifted once in each of successive ones of the horizontally scanning periods by an amount which is equal to a time difference $\Delta t$ divided by a total number of horizontal scan lines of the flat configuration image display apparatus, where $\Delta t$ is a difference between an amount of time which elapses from a starting time point of the main horizontal deflection voltage waveform during scanning of an uppermost one of the scan lines by one of the pair of electron beams, until the electron beam becomes incident upon a predetermined one of the fluorescent layer portions, and an amount of time which elapses from the starting point of the main horizontal deflection voltage waveform during scanning of a lowermost one of the scan lines by a second one of the pair of electron beams, until the electron beam becomes incident upon a fluorescent layer portion which is vertically aligned with the predetermined fluorescent layer portion.

BRIEF DESCRIPTION OF THE DRAWINGS

FIG. 5 is a diagram for illustrating relationships between electron beam scanning paths and a position deviation between the fluorescent layer pattern and horizontal deflection electrodes, in an embodiment of a flat configuration image display apparatus according to the present invention;

FIG. 7 is a waveform diagram for illustrating timing relationships between a main horizontal deflection voltage, a correction deflection voltage, and corresponding beam landing positions of an electron beam, in this embodiment; and FIG. 8 is a general block diagram showing circuits for generating modulation signals, main horizontal deflection voltage, and correction deflection voltage, in this embodiment.

DESCRIPTION OF THE PREFERRED EMBODIMENTS

Figure 4:
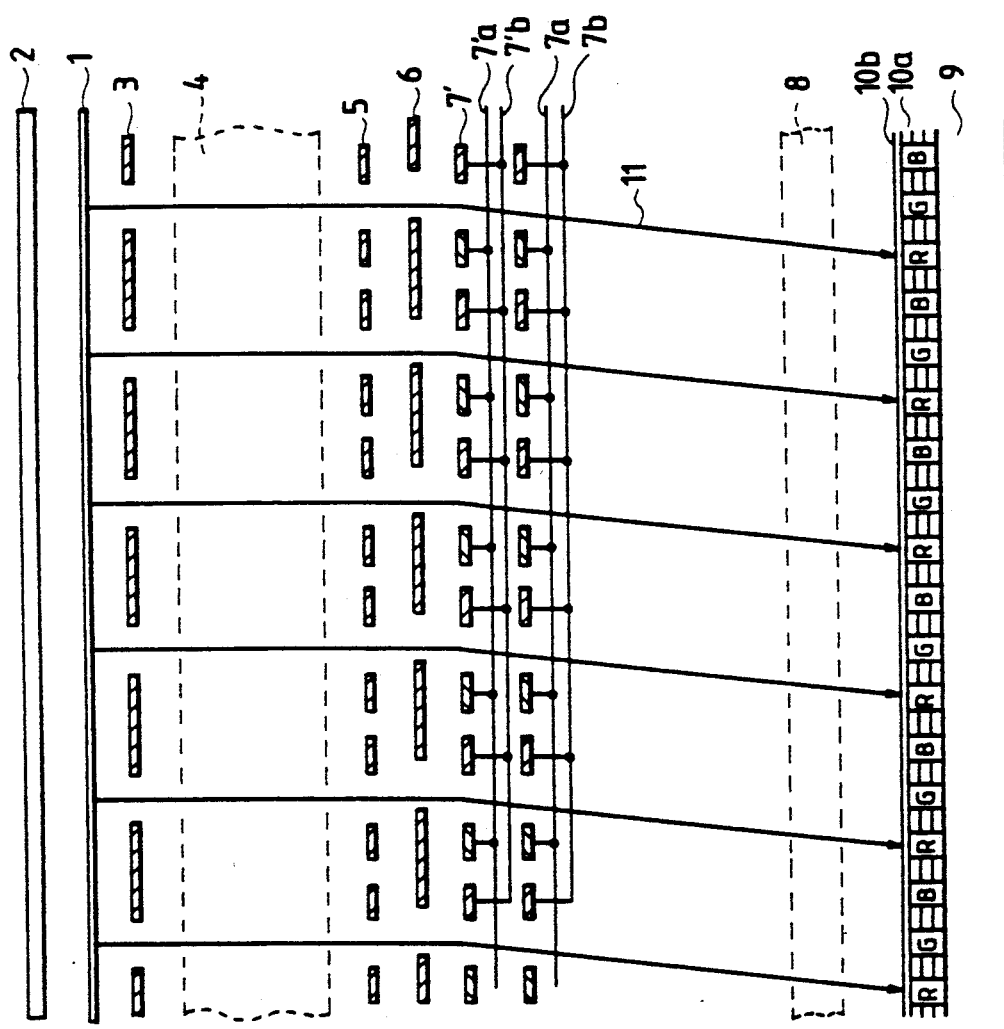
FIG. 4 is a plan cross-sectional view of interior components of a CRT of a flat configuration image display apparatus according to the present invention.

An embodiment of a flat configuration image display apparatus according to the present invention will be described in the following referring to the drawings. FIG. 4 is a cross-sectional view taken along the horizontal direction of an embodiment of a flat configuration image display apparatus according to the present invention.

As shown in FIG. 4, this embodiment differs from the prior art example described above in that two sets of horizontal deflection electrodes are disposed between the shield electrode 6 and the beam acceleration electrodes 8, i.e. correction deflection electrodes 7' in addition to the horizontal deflection electrodes 7. The remainder of the configuration is identical to that of the prior art example, consisting of the back electrode 2, line cathodes 1, beam extraction electrode 3, vertical deflection electrodes 7, modulation electrodes 5, transparent substrate 9 and photoemissive section 10 (fluorescent layer portions 10a, metal back layer 10b). As in the case of the prior art example, the horizontal deflection electrodes 7 consists of two comb-shaped electrodes which are electrically mutually separate, as also does the correction deflection electrodes 7'. Each of these comb-shaped electrodes is electrically equivalent to a set of vertically extending segments (the comb "teeth") which are mutually interconnected by a common bus lead, and the comb-shaped electrodes of the horizontal deflection electrodes 7 and correction deflection electrodes 7' are thus represented in FIG. 4. Thus as a result of the intermeshing of these vertically extending segments, alternate ones of the segments of the correction deflection electrodes 7' (as viewed in plan cross-section) are connected to the bus leads 7'a, 7'b respectively, while alternate ones of the vertically extending segments of the horizontal deflection electrodes 7 are connected to the bus leads 7a, 7b respectively.

The operation of this embodiment is as follows. Firstly, the case in which the electron beams 11 are deflected only by the horizontal deflection electrodes 7 will be considered, (i.e. with no deflection voltage being applied to the correction deflection electrodes 7').

Figure 2:
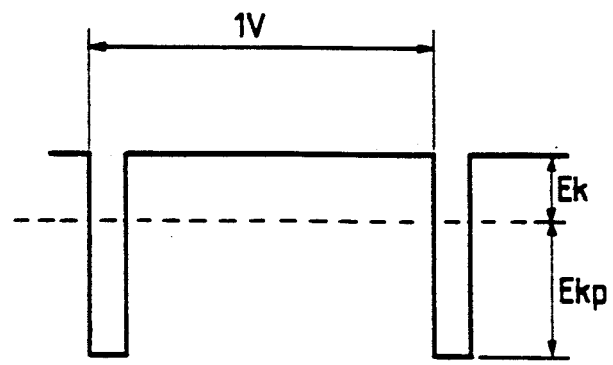
FIG. 2 is a waveform diagram for describing a method of driving line cathodes of the CRT of FIG. 1.
Figure 3:
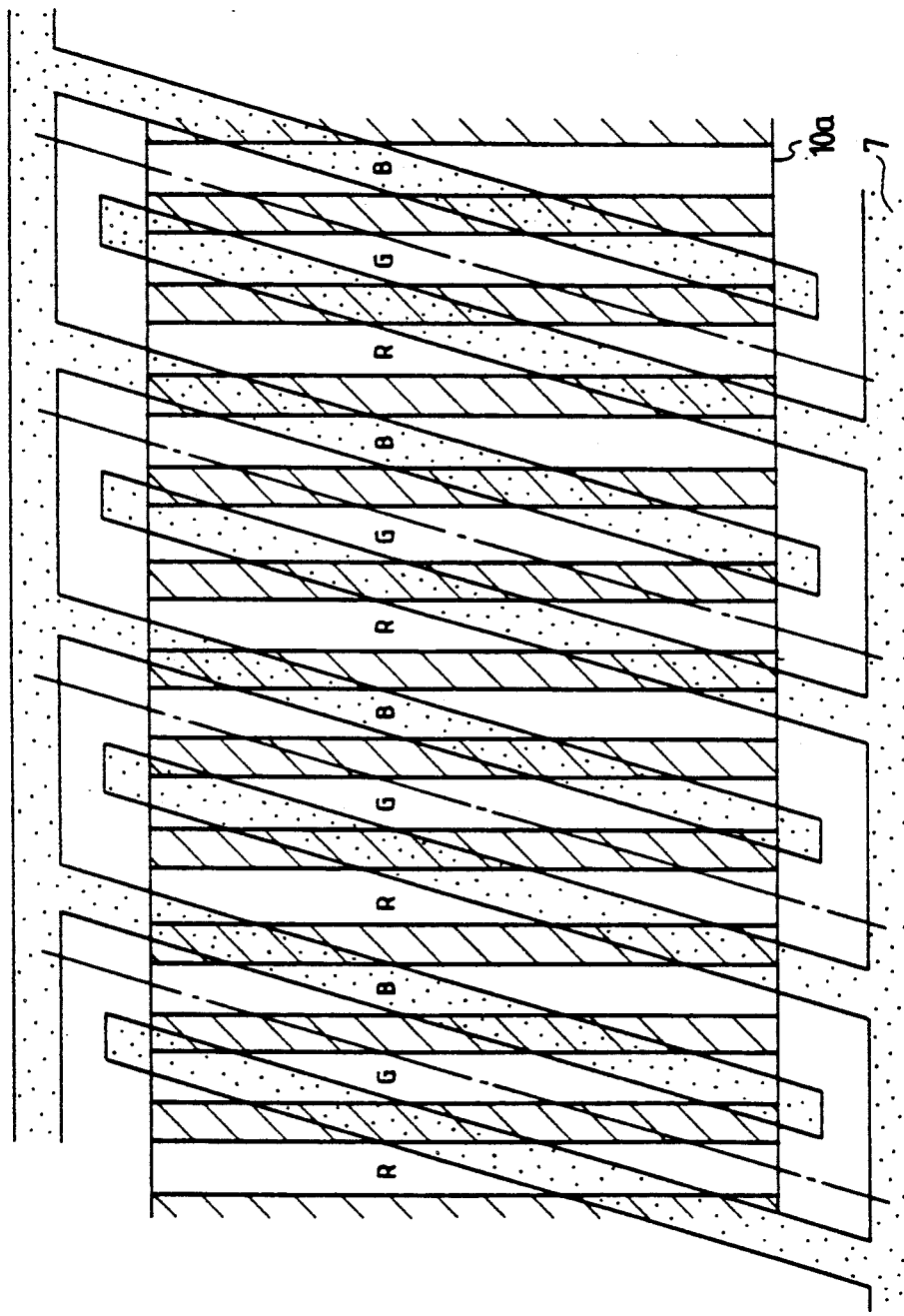
FIG. 3 is a diagram for describing a rotational position deviation between a fluorescent layer pattern and horizontal deflection electrodes of the flat configuration CRT of FIG. 1.

FIG. 5 illustrates the positional relationships between the stripe pattern of the fluorescent layer portions 10a of the photoemissive section 10 and the horizontal deflection electrodes 7. It is assumed in FIG. 5 that a rotational position deviation has occured at the time of manufacture, between the stripe pattern of the fluorescent layer portions 10a and the horizontal deflection electrodes 7. A deflection voltage is applied between the two comb-shaped electrodes of the horizontal deflection electrodes 7, by applying a sawtooth waveform waveform voltage 30a shown in FIG. 6A to one of these electrodes and the sawtooth waveform waveform voltage 30b (of reverse polarity to the voltage 30a) to the other electrode. It is assumed for simplicity of description in FIG. 2 that each electron beam 11 repetitively scans one R, G, B color stripe trio, i.e. that the width of each display block is the pitch of an R, G, B trio.

Figure 1:
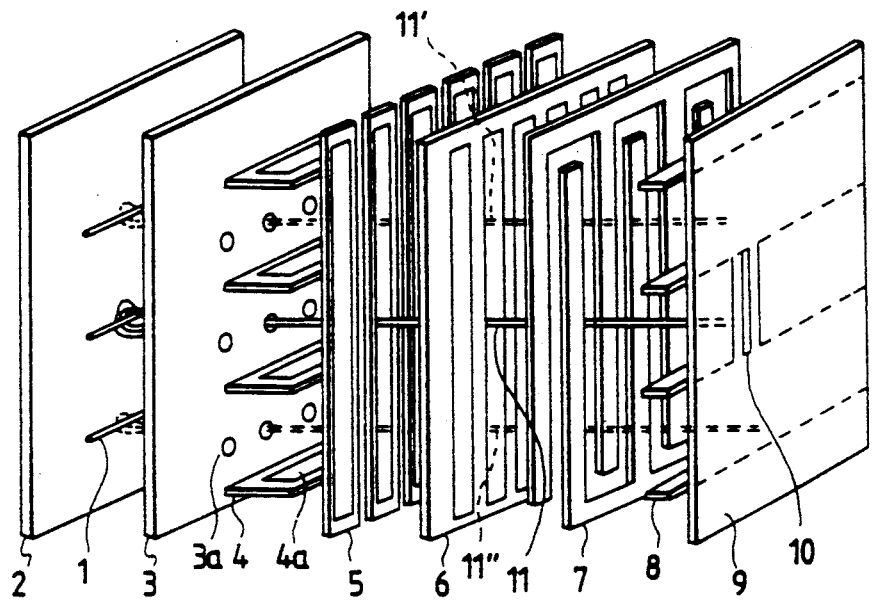
FIG. 1 is an oblique view of interior components of an example of a flat configuration CRT known in the prior art.

The operation will be described based on deflection of three electron beams which have respective beam landing positions (in the horizontally undeflected state) that are substantially mutually aligned in a line which would coincide with a specific color stripe of section 10a, if there were no position deviation between section 10a and the horizontal scanning electrodes. These electron beams are respectively deflected for the beam landing paths 22, 23 and 24 which are in the uppermost, middle, and lowermost scanning scan lines of the display picture respectively as shown in FIG. 5. That is to say the three paths 22, 23 and 24 correspond to respective scan lines of three vertically aligned display blocks (described hereinabove referring to FIG. 1). In order to achieve compensation for the position deviation, it is necessary to extend the horizontal scanning width of each electron beam 11 beyond the scan width (i.e. one trio pitch, in this example) that would be required if there were no position deviation. For example if the anticipated maximum amount of position deviation between the fluorescent layer portions 10a and the horizontal deflection electrodes 7 is, as in this example, equal to ¼ of the trio pitch (where one trio consists of a horizontally extending set of R, G and B fluorescent layer portions) then the horizontal scan width is made at least 1.5 times the trio pitch, as illustrated in FIG. 5. The designation "position deviation as measured in the vertical direction" signifies an amount of position difference between the horizontally undeflected position of a lowermost electron beam scanning path (e.g. the central point 24a of path 24 in FIG. 2) and the horizontally undeflected position of an uppermost electron beam scanning path (e.g. the central point 22a of path 22 in FIG. 2), as measured in the horizontal direction.

One feature of the invention is to ensure that for each horizontal scanning path, e.g. the paths 22, 23 and 24 in FIG. 5, successive identically (vertically) positioned R, G, B trios are scanned, in spite of the position deviation between the stripe pattern 10a and the horizontal deflection electrodes 7.

Figure 6A:
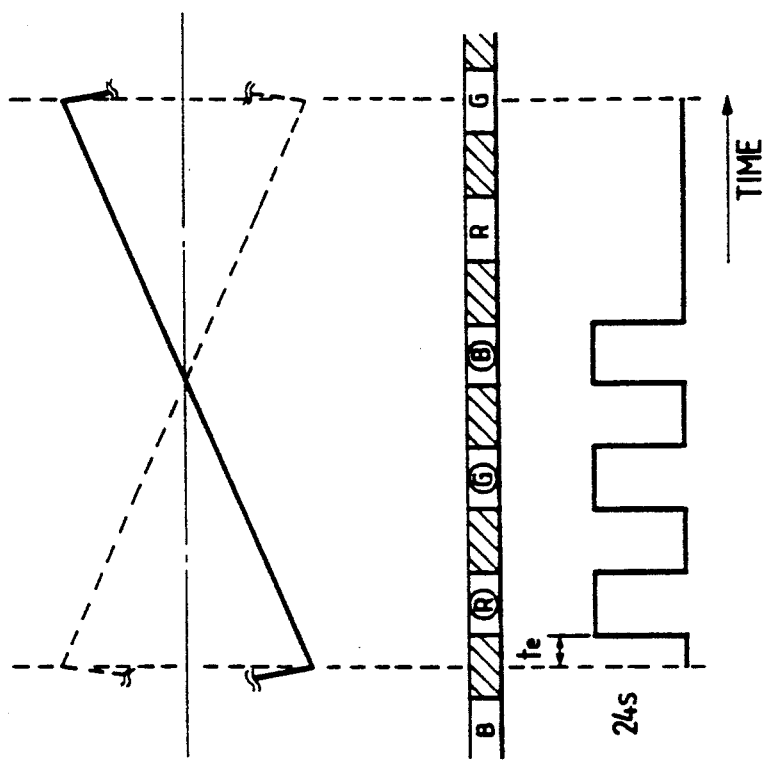
FIGS. 6A, 6B are waveform diagrams for illustrating the basic principles of modulation signal phase shifting for position deviation correction, in this embodiment.
Figure 6B:
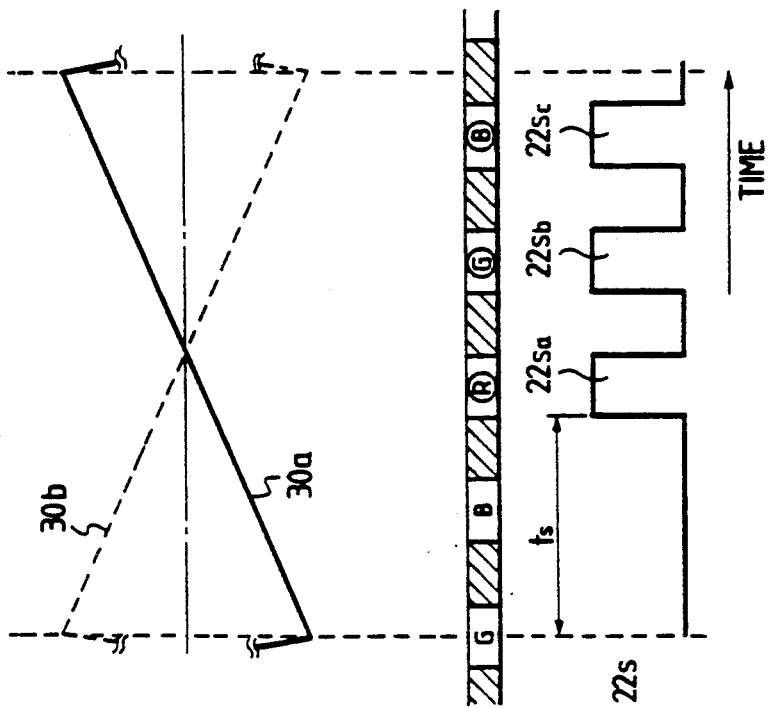

FIGS. 6A and 6B illustrate the scanning paths 22 and 24 respectively, transformed to the time axis. The waveform 22s shown in FIG. 6A represents the modulation signal which is applied, during scanning of the path 22, to the one of the modulation electrodes 5 that corresponds to the R, G, B color trios which are scanned in the paths 22, 23 and 24. This modulation signal consists, during each horizontal scanning interval (1 H interval) of a set of 3 modulation voltage pulses $22s_a$, $22s_b$ and $22s_c$, which are amplitude or pulse-width modulated. In the case of the upper region 22 the electron beam 11 scans the fluorescent layer portions 10a in the sequence B-R-G-B, and only falls upon the appropriate fluorescent layer portion (i.e. the R fluorescent layer portion) after a time interval $t_s$ has elapsed from the start of horizontal scanning. Thus, the R modulation voltage pulse is applied to the corresponding one of the modulation electrodes 5 when the time interval $T_s$ has elapsed after the start of horizontal scanning of path 22, and thereafter the G, and B modulation voltage pulses are successively applied to the modulation electrodes 5 at the appropriate times, in accordance with the electron beam scanning speed.

On the other hand as shown in FIG. 6B, in the case of the lowermost scan path 24, the electron beam 11 scans the color stripes 10a in the sequence R→G→B→R. The electron beam 11 reaches the appropriate fluorescent layer portion (i.e. the correct one of the R color stripes) after a time interval $t_e$ has elapsed from the start of horizontal scanning. In FIG. 6B, $t_e$ is assumed to be substantially smaller than $t_s$. At that point, the R modulation voltage pulse is applied to the modulation electrodes 5, and thereafter the G and B modulation voltage pulses are sequentially applied at times in accordance with the electron beam scanning speed.

Scanning of all of the other R, G, B trios in each scan line, and corresponding application of modulation signals to the modulation electrodes 5, are executed in synchronism with that described for the scanning paths 22, 23 and 24.

In this way, by adjusting the timings at which the modulation signal pulses are applied to the modulation electrodes 5, it is possible to correct for picture deformation and color reproduction inaccuracies that result from a relative position deviation between the horizontal deflection electrodes 7 and the stripe pattern of the fluorescent layer portions. This position deviation can be represented as a time difference $\Delta t$ between the time interval $t_s$ which elapses from the start of horizontal scanning of an uppermost scan line of the display until an electron beam reaches a specific one of the fluorescent layer portions (i.e. the R color stripe, in the above example) and the time interval which elapses from the start of horizontal scanning of a lowermost scan line of the display until an electron beam reaches one of the fluorescent layer portions that is vertically aligned with the aforementioned specific one of the fluorescent layer portions, where $\Delta t$ is obtained as:

$$\Delta t = (t_s - t_e).$$

Designating the total number of horizontal scan lines of the display as m, the modulation signal pulse timings must be changed once in each scan line by an amount equal to $\Delta t/m$, i.e. the modulation signal pulses must be phase shifted once in each horizontal scanning interval by an amount corresponding to $\Delta t/m$.

If a simple sawtooth waveform horizontal deflection voltage is used as shown in FIGS. 6A, 6B, then it is necessary to shield the electron beams in the intervals in which each beam is moving between mutually adjacent ones of the fluorescent layer portions, in order to prevent reduction of color saturation of the image that is produced. For that reason, the efficiency of utilization of the electron beams 11 is poor, and the display brightness is low. In order to overcome this problem with the present invention, a correction deflection voltage which is a sawtooth waveform voltage 41a having a shorter period than the main horizontal deflection voltage and opposite directions of waveform slope to the main horizontal deflection voltage is applied to the correction deflection electrodes 7'. This is illustrated in FIG. 7, in which the correction deflection voltage 41a has a fixed period that is substantially equal to (1/n) times the period of the main horizontal deflection voltage 40a, where n is an integer. As a result, the duration of each of the time intervals for which the electron beam 11 is incident on respective ones of the color fluorescent layer portions 10a is increased.

In FIG. 7, time is plotted along the horizontal axis. 45 denotes the deflection path of a beam spot which traverses the R, G, B stripes of the fluorescent layer portions 10a, with beam landing position being plotted along the vertical axis. 40a denotes the waveform of main horizontal deflection voltage, with amplitude plotted along the vertical axis. The voltage 40a is applied to the bus lead 7a in FIG. 4, while a voltage of opposite polarity is applied to bus lead 7b.

FIG. 7 will be described in greater detail as follows, together with FIG. 8 which is a general block diagram of a flat configuration image display apparatus according to the present invention together with circuits for generating the various voltages which must be supplied to the flat configuration image display apparatus. In FIG. 8 an input color video signal is supplied to a memory 51. This will be assumed to be a digital signal, and it will be assumed that each sample of the digital color video signal corresponds to one of a trio of R, G, B-elements which form a pixel of a display image. A horizontal synchronizing signal HD and a vertical synchronizing signal VD corresponding to this color video signal are supplied to a timing pulse generating circuit 50. The horizontal synchronizing signal HD is also applied to a main horizontal deflection voltage generating circuit 53, which generates the main horizontal deflection voltage having a period of 1 H as shown in FIG. 7, between output lines 53a, 53b, which are respectively coupled to the comb-shaped electrodes of the horizontal deflection electrodes 7. The timing pulse generating circuit 50 includes for example a PLL (phase locked loop) circuit which is synchronized with the HD signal, and generates the timing pulses 42 shown in FIG. 7, which are inputted to a correction deflection voltage generating circuit 52 and are also supplied to the memory 51 for controlling the timings of readout of the color sample values stored therein. The correction deflection voltage generating circuit 52 generates the correction deflection voltage having the waveform 41a shown in FIG. 7, which is a sawtooth waveform voltage having opposite directions of slope to the main horizontal deflection voltage 40a. The correction deflection voltage 41a is applied to the bus lead 7'a shown in FIG. 4, while a corresponding deflection voltage of opposite polarity is applied to the bus lead 7'b, with these being outputted from the correction deflection voltage generating circuit 52 on leads 52a, 52b respectively and thus applied to the upper and lower comb-shaped electrodes respectively of the correction deflection electrodes 7'.

The memory 51 can be formed of a 1-line memory into which successive digital samples for one scan line are successively written, and an output latch circuit which outputs the data of one line while the succeeding line is being written in. Each color sample value read out from the memory 51 is thereby converted to an analog signal pulse having a corresponding amplitude, which is then amplified and applied as a modulation signal pulse to the corresponding one of the modulation electrodes 5, by a digital/analog conversion and drive amplifier section 54. (It should be noted that although amplitude modulation is assumed here, the invention is equally applicable to pulse-width modulation of the electron beams). During each interval in which a modulation voltage pulse 46 is thus being applied to one of the modulation electrodes 5, both the correction deflection voltage and the main deflection voltage are acting upon the corresponding one of the electron beams in a mutually opposing manner, due to their mutually different directions of waveform slope. Thus, the rate of scanning of the electron beam across the color stripes 10a is brought close to zero while the modulation voltage pulse is being applied. Alternatively stated, the duration of each interval in which a color stripe is being scanned by an electron beam is increased over the prior art. The width of each modulation voltage pulse 46 applied to the modulation electrodes 5 can be correspondingly increased, so that a high degree of display brightness is achieved. At the end of a modulation voltage pulse the correction deflection voltage rapidly changes in value, in the same direction as that of the main deflection voltage. As a result, the electron beam is very rapidly moved to fall upon the next one of the R, G, B color stripes, whereupon the next modulation voltage pulse is applied to the corresponding one of the modulation electrodes 5.

Although the above description has been given for a single electron beam, all of the electron beams of one row of beams are deflected in synchronism during each 1 H interval. That is to say, for the case of this embodiment in which it is assumed for simplicity of description that the width of each display block is identical to the R, G, B trio pitch, modulation voltage pulses 46a for driving the R stripes of respective trios of R, G, B color stripes of the fluorescent layer portions 10a are outputted in parallel from the D/A converter and drive amplifier section 54 following the start of a (1 H) scan line interval, to drive the red-emission elements of one entire horizontal scan line, then the process is repeated for the modulation voltage pulses 46b which drive the green-emission elements of the line, then the pulses 46c which drive the blue-emission elements. The electron beams are then deflected vertically by one line spacing, and the above process is repeated for the next scan line.

The phase of the timing pulses from the correction deflection voltage generating circuit 52 is successively varied by the fixed amount $\Delta t/m$ in successive 1 H intervals, as described hereinabove referring to FIGS. 6A, 6B.

It can be understood from the above that the timing pulses 42 are identical in phase to the modulation signal pulses 46. The repetition period $T_s$ of the pulses 42 within the effective horizontal scan portion of each 1 H interval (i.e. excluding the horizontal blanking portion) is determined as the time that would be taken for the electron beam 11 to move between two mutually adjacent ones of a trio of R, G, B fluorescent layer portions if the main horizontal deflection voltage alone were to act on the electron beam. The pulses 42 also include timing pulses 42p, each of which is followed by a longer period, including the horizontal blanking interval. The period between each of these pulses 42p and the succeeding one of the pulses 42, in this embodiment, is equal to the time taken for the electron beam 11 to move from the last part of one R, G, B fluorescent element trio to at least the start of the first element of the next trio (in the next 1 H interval).

Based on these timing pulses 42, the correction voltage sawtooth waveform voltage 41a is generated, which is one of a pair of sawtooth waveform voltages of mutually opposite polarity. These sawtooth waveform correction voltages are applied to the correction deflection electrodes 7' whereby the electron beam 11 is influenced both by this deflection voltage and the deflection voltage of the horizontal deflection electrodes 7, and so is deflected such that the beam landing position changes as indicated by the path 45 in FIG. 7.

With the present invention, it is essential that the main horizontal deflection voltage 40a and correction deflection voltage 41a are of opposite directions of slope. Specifically, whereas the waveform of the main horizontal deflection voltage 40a consists of a succession of rapidly changing portions (changing in a first direction) each followed by a gradually changing portion (changing in a second direction), the waveform 41a of the correction deflection voltage consists of a succession of rapidly changing portions (changing in the second direction) each followed by a gradually changing portion (changing in the first direction).

As a result, in this embodiment, the duration of each time interval for which an electron beam 11 is incident on each of the fluorescent layer portions is made approximately twice the value of time interval that occurs when only a main horizontal deflection voltage having the waveform shown in FIGS. 6A, 6B is applied. Display brightness is thereby substantially increased.

The phase of the timing pulses from the correction deflection voltage generating circuit 52 is successively shifted by a fixed amount in successive 1 H intervals, with the amount of phase shift being determined in accordance with an amount of position deviation between the fluorescent layer portions and the horizontal deflection electrodes 7, as described hereinabove referring to FIGS. 6A, 6B. This phase shifting of the timing pulses (and hence corresponding phase shifting of the modulation signal pulses from the D/A converter and drive amplifier section 54 and the correction deflection voltage from the correction deflection voltage generating circuit 52) is executed by the timing pulse generating circuit 50, which includes a circuit for generating pulses which are synchronized with the HD signal, e.g. a PLL (phase lock loop circuit), and also includes means for storing a value corresponding to the amount of position deviation, and for executing successive phase shifting of the timing pulses 42 in sequential 1 H intervals by the amount $\Delta t/m$ described above. Circuits for executing such controlled phase shifting are well known in the art, and detailed description will be omitted. Setting of the aforementioned value into the timing pulse generating circuit 50 can be done at the time of manufacture of the apparatus.

It should be noted that the present invention is not limited to the embodiment described above, and that for example it would be possible to invert the respective positions of the horizontal deflection electrodes 7 and the correction deflection electrodes 7'. Moreover, if the level of deflection voltage applied to the correction deflection electrodes 7' is sufficiently small then, with the correction deflection electrodes 7' positioned as shown in FIG. 4, it may be possible to eliminate the shield electrode 6.

With the present invention as described in the above, a flat configuration image display apparatus is provided with two sets of horizontal deflection electrodes, with a main deflection voltage being applied to one set of horizontal deflection electrodes and with a correction deflection voltage being applied to the other set of horizontal deflection electrodes, with the correction deflection voltage having a period which is substantially equal to (1/n) times that of the main deflection voltage (where n is an integer of value 2 or more), with the waveform shape of the correction deflection voltage being selected such as to oppose a deflection action applied by the main horizontal deflection voltage, during each of successive time intervals in which electron beams are incident upon fluorescent layer portions of the photo-emissive surface, and with modulation signals applied to the electron beams being synchronized with these timings. Display brightness and contrast are thereby substantially enhanced. In addition, by changing the phase of the aforementioned successive time intervals by a specific amount once in each horizontal scanning interval while changing the phase of the modulation signals in an identical manner, it becomes possible to combine this increase in display brightness with the elimination of color deviations between upper and lower parts of the display, which would otherwise result from a rotational position deviation between the fluorescent layer portion pattern and the horizontal deflection electrodes. Hence, the manufacturing yield of such a flat configuration image display apparatus can be increased.

Moreover it is not necessary to apply a high level of drive voltage to the correction electrodes, so that in spite of the fact that high-frequency operation is required for the circuits which generate the correction deflection voltage, these circuits can be designed for low power consumption.

What is claimed is:

1. In a flat configuration image display apparatus including means for generating a plurality of electron beams within an evacuated containing envelope, modulation electrode means for modulating said electron beams, means for applying electron beam modulation signals to said modulation electrode means, a display surface formed with a pattern of fluorescent layer portions, and scanning means for deflecting said electron beams as an array of horizontal scan lines traversing said fluorescent layer portions, said scanning means including main horizontal deflection electrodes for horizontally deflecting said electron beams and main horizontal deflection voltage generating means for applying between said main horizontal deflection electrodes a main horizontal deflection voltage having a sawtooth waveform with a period equal to a horizontal scanning period, the improvement comprising:

correction deflection electrodes positioned to horizontally deflect said electron beams; and correction deflection voltage generating means for applying between said correction deflection electrodes a correction deflection voltage having a sawtooth waveform with a period that is substantially equal to 1/n times said horizontal scanning period, where n is a fixed integer of value 2 or more, said sawtooth waveform of the correction deflection voltage and said sawtooth waveform of the main horizontal deflection voltage having mutually opposite directions of slope.

2. A flat configuration image display apparatus according to claim 1, in which said correction deflection voltage is synchronized with said electron beam modulation signals.

3. A flat configuration image display apparatus according to claim 1, in which said electron beams include at least one pair of electron beams which are substantially mutually vertically aligned when in a horizontally non-deflected condition, and further comprising means for successively shifting the phase of the electron beam deflection voltage and the correction deflection voltage in sequential ones of said horizontal scanning periods by an amount corresponding to a time difference $\Delta t$ divided by a total number of horizontal scan lines of said image display apparatus, where $\Delta t$ is a difference between an amount of time which elapses from a starting time point of said main horizontal deflection voltage waveform during scanning of an uppermost one of said scan lines by one of said pair of electron beams, until said electron beam becomes incident upon a predetermined one of said fluorescent layer portions, and an amount of time which elapses from said starting point of the main horizontal deflection voltage waveform during scanning of a lowermost one of said scan lines by a second one of said pair of electron beams, until said electron beam becomes incident upon a fluorescent layer portion which is vertically aligned with said predetermined fluorescent layer portion.

4. A flat configuration image display apparatus according to claim 3, in which said means for applying electron beam modulation signals comprises memory means for temporarily holding data of an input video signal and subsequently outputting said data as said modulation signals, and in which said means for successively shifting the phase of the electron beam deflection voltage and the correction deflection voltage comprises timing pulse generating circuit means for receiving horizontal and vertical synchronizing signal components of said video signal and for generating timing pulses which are successively phase shifted with respect to said horizontal synchronizing signal component by said amount t in sequential ones of the horizontal scanning periods in each frame of said video signal, said timing pulses being applied to control the phase of readout operations of said memory means and applied to said correction deflection voltage generating means to control the phase of said correction deflection voltage.

5. A flat configuration image display apparatus according to claim 2, in which said electron beams include at least one pair of electron beams which are substantially mutually vertically aligned when in a horizontally non-deflected condition, and further comprising means for successively shifting the phase of the electron beam deflection voltage and the correction deflection voltage in sequential ones of said horizontal scanning periods by an amount corresponding to a time difference $\Delta t$ divided by a total number of horizontal scan lines of said image display apparatus, where $\Delta t$ is a difference between an amount of time which elapses from a starting time point of said main horizontal deflection voltage waveform during scanning of an uppermost one of said scan lines by one of said pair of electron beams, until said electron beam becomes incident upon a predetermined one of said fluorescent layer portions, and an amount of time which elapses from said starting point of the main horizontal deflection voltage waveform during scanning of a lowermost one of said scan lines by a second one of said pair of electron beams, until said electron beam becomes incident upon a fluorescent layer portion which is vertically aligned with said predetermined fluorescent layer portion.

6. In a flat configuration image display apparatus including means for generating a plurality of electron beams within an evacuated containing envelope, modulation electrode means for modulating said electron beams, means for applying electron beam modulation signals to said modulation electrode means, a display surface formed with a pattern of fluorescent layer portions, and scanning means for deflecting said electron beams as an array of horizontal scan lines traversing said fluorescent layer portions, said scanning means including main horizontal deflection electrodes for horizontally deflecting said electron beams and main horizontal deflection voltage generating means for applying between said main horizontal deflection electrodes a main horizontal deflection voltage having a sawtooth waveform with a period equal to a horizontal scanning period, the improvement comprising:

brightening means for brightening an image produced by said electron beams, said brightening means comprising reducing means for reducing a scan velocity of said electron beams across said fluorescent layer portions during each said horizontal scanning period.

7. An improved apparatus as recited in claim 6, wherein said brightening means further comprises increasing means for increasing scan velocity of said electron beams across intermediate regions between said fluorescent layer portions.

8. An improved apparatus as recited in claim 6, wherein said reducing means comprises modifying means for modifying a deflection voltage applied to said electron beams thereby to reduce said scan velocity thereof.

9. An improved apparatus as recited in claim 8, wherein said modifying means comprises field means for counteracting a field generated by said horizontal deflection voltage applied to said main horizontal deflection electrodes when said electron beams scan across said fluorescent layer portions and for augmenting said field when said electron beams scan across said intermediate regions.

10. An improved apparatus as recited in claim 9 wherein said field means comprises:

compensating horizontal deflection electrodes and voltage generating means for applying between said compensating horizontal deflection electrodes a compensating horizontal deflection voltage having a sawtooth waveform with a slope opposite to a slope of the sawtooth waveform of said main horizontal deflection voltage.

11. An improved apparatus as recited in claim 10 wherein said compensating horizontal deflection voltage applied by said voltage generating means has a period substantially equal to 1/n times said horizontal scanning period of the sawtooth waveform of said main horizontal deflection voltage.

12. An improved apparatus as recited in claim 9 wherein said field means comprises:

compensating horizontal deflection electrodes and voltage generating means for applying between said compensating horizontal deflection electrodes a compensating horizontal deflection voltage having a sawtooth waveform with a period substantially equal to 1/n times said horizontal scanning period of the sawtooth waveform of said main horizontal deflection voltage.

* * * * *